United States Patent
Shigeeda et al.

(10) Patent No.: US 8,705,525 B2
(45) Date of Patent: Apr. 22, 2014

(54) COMMUNICATION RELAY DEVICE FOR TRAIN AND COMMUNICATION RELAY METHOD FOR TRAIN

(75) Inventors: Tetsuya Shigeeda, Tokyo (JP); Hideharu Inoue, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 739 days.

(21) Appl. No.: 12/864,155

(22) PCT Filed: Apr. 7, 2008

(86) PCT No.: PCT/JP2008/056898
§ 371 (c)(1),
(2), (4) Date: Jul. 22, 2010

(87) PCT Pub. No.: WO2009/125470
PCT Pub. Date: Oct. 15, 2009

(65) Prior Publication Data
US 2010/0303070 A1    Dec. 2, 2010

(51) Int. Cl.
*H04L 12/28* (2006.01)

(52) U.S. Cl.
USPC .......................................... 370/389; 701/32.7

(58) Field of Classification Search
USPC ................ 370/389, 390, 392; 701/29.6, 32.7
See application file for complete search history.

(56) References Cited

U.S. PATENT DOCUMENTS

| | | | |
|---|---|---|---|
| 2003/0183697 A1* | 10/2003 | Porter | 235/492 |
| 2003/0183729 A1* | 10/2003 | Root et al. | 246/167 R |
| 2006/0180709 A1 | 8/2006 | Breton et al. | |
| 2007/0061056 A1 | 3/2007 | Valsorda | |
| 2008/0053331 A1* | 3/2008 | Marra et al. | 105/26.05 |
| 2009/0042436 A1 | 2/2009 | Emoto et al. | |
| 2011/0286464 A1* | 11/2011 | Shigeeda et al. | 370/400 |
| 2012/0310453 A1* | 12/2012 | Brooks et al. | 701/20 |

FOREIGN PATENT DOCUMENTS

| | | |
|---|---|---|
| CN | 101061018 A | 10/2007 |
| EP | 1995147 A1 | 11/2008 |
| JP | 8-98302 A | 4/1996 |
| JP | 9-28001 A | 1/1997 |
| JP | 2001-88704 A | 4/2001 |
| JP | 2004-201476 A | 7/2004 |
| JP | 3847705 B2 | 11/2006 |
| WO | 2009000544 A1 | 12/2008 |

OTHER PUBLICATIONS

Douglas E. Comer, "Internetworking with TCP/IP", vol. 1, 4th Edition, Kyoritsu Shuppan Co., Ltd., Aug. 2008, 5 pages.

(Continued)

*Primary Examiner* — Hassan Phillips
*Assistant Examiner* — Ajay Cattungal
(74) *Attorney, Agent, or Firm* — Buchanan Ingersoll & Rooney PC

(57) ABSTRACT

When data is transmitted from a first communication terminal to a second communication terminal, a communication relay device converts car identification information of a communication source of communication-source identification information included in a communication packet into a car number of a vehicle, and transmits the data to an inter-vehicle communication path. When data is transmitted from the second communication terminal to the first communication terminal, the communication relay device converts car identification information of a communication destination of communication-destination identification information included in a communication packet into a "0"-th car indicating own car, and transmits the data to an in-vehicle communication path.

8 Claims, 23 Drawing Sheets

(56) References Cited

OTHER PUBLICATIONS

International Search Report (PCT/ISA/210) dated Jul. 8, 2008.
Written Opinion (PCT/ISA/237) dated Jul. 8, 2008.

Office Action dated Jul. 4, 2012, issued in corresponding Chinese Patent Application No. 200880128493.X. (5 pages).
Extended Search Report from the European Patent Office dated Dec. 5, 2013, issued in corresponding European Patent Application No. 08740001.6. (6 pages).

* cited by examiner

FIG.3

| COMMUNICATION-DESTINATION IDENTIFICATION INFORMATION | | COMMUNICATION-SOURCE IDENTIFICATION INFORMATION | | DATA PORTION |
|---|---|---|---|---|
| CAR IDENTIFICATION INFORMATION OF COMMUNICATION DESTINATION | DEVICE IDENTIFICATION INFORMATION OF COMMUNICATION DESTINATION | CAR IDENTIFICATION INFORMATION OF COMMUNICATION SOURCE | DEVICE IDENTIFICATION INFORMATION OF COMMUNICATION SOURCE | |

FIG.4

| COMMUNICATION-DESTINATION IDENTIFICATION INFORMATION | | COMMUNICATION-SOURCE IDENTIFICATION INFORMATION | | DATA PORTION |
|---|---|---|---|---|
| CAR IDENTIFICATION INFORMATION OF SECOND CAR | DEVICE IDENTIFICATION INFORMATION OF COMMUNICATION TERMINAL 4b | CAR IDENTIFICATION INFORMATION OF OWN CAR | DEVICE IDENTIFICATION INFORMATION OF COMMUNICATION TERMINAL 4a | |

FIG.5

| COMMUNICATION-DESTINATION IDENTIFICATION INFORMATION | | COMMUNICATION-SOURCE IDENTIFICATION INFORMATION | | DATA PORTION |
|---|---|---|---|---|
| CAR IDENTIFICATION INFORMATION OF SECOND CAR | DEVICE IDENTIFICATION INFORMATION OF COMMUNICATION TERMINAL 4b | CAR IDENTIFICATION INFORMATION OF FIRST CAR | DEVICE IDENTIFICATION INFORMATION OF COMMUNICATION TERMINAL 4a | |

FIG.6

| COMMUNICATION-DESTINATION IDENTIFICATION INFORMATION | | COMMUNICATION-SOURCE IDENTIFICATION INFORMATION | | DATA PORTION |
|---|---|---|---|---|
| CAR IDENTIFICATION INFORMATION OF OWN CAR | DEVICE IDENTIFICATION INFORMATION OF COMMUNICATION TERMINAL 4b | CAR IDENTIFICATION INFORMATION OF FIRST CAR | DEVICE IDENTIFICATION INFORMATION OF COMMUNICATION TERMINAL 4a | |

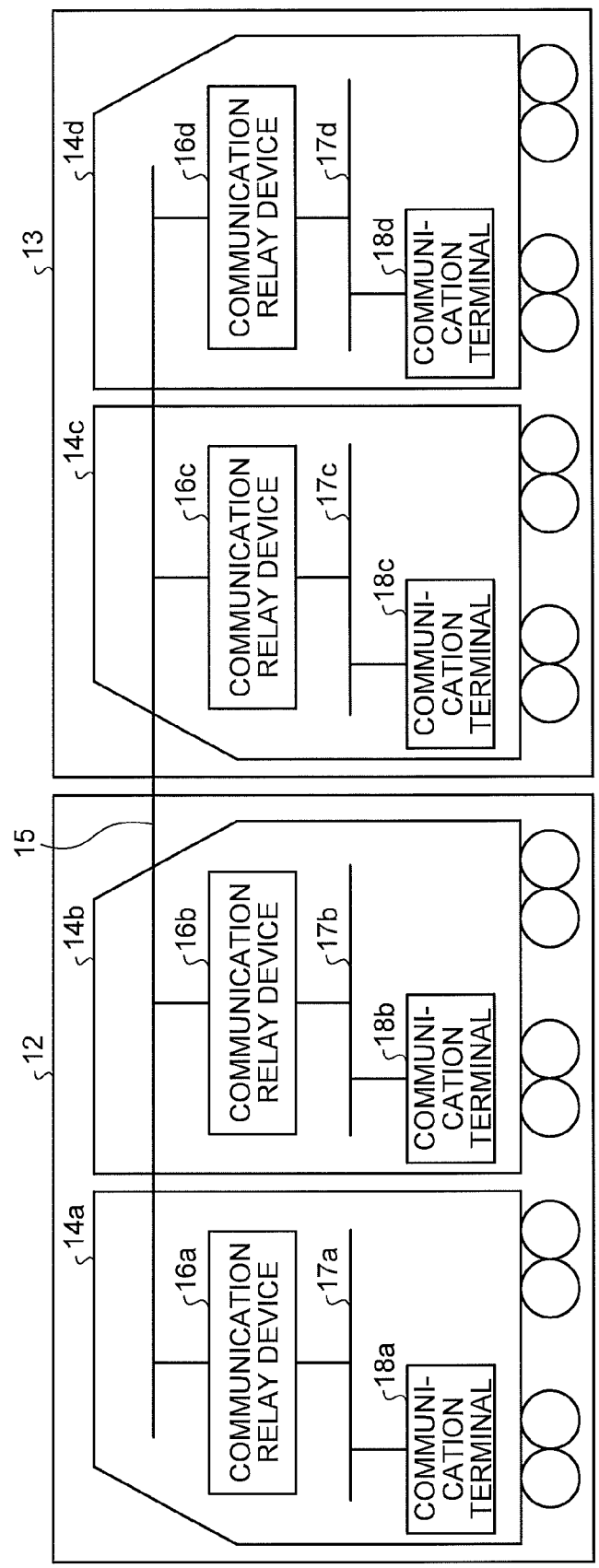

FIG.8

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | DEVICE IDENTIFICATION INFORMATION OF COMMUNICATION DESTINATION | FORMATION IDENTIFICATION INFORMATION OF COMMUNICATION SOURCE | DEVICE IDENTIFICATION INFORMATION OF COMMUNICATION SOURCE | |

FIG.9

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF SECOND FORMATION | DEVICE IDENTIFICATION INFORMATION OF COMMUNICATION TERMINAL 18c | FORMATION IDENTIFICATION INFORMATION OF OWN FORMATION | DEVICE IDENTIFICATION INFORMATION OF COMMUNICATION TERMINAL 18a | |

FIG.10

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF SECOND FORMATION | DEVICE IDENTIFICATION INFORMATION OF COMMUNICATION TERMINAL 18c | FORMATION IDENTIFICATION INFORMATION OF FIRST FORMATION | DEVICE IDENTIFICATION INFORMATION OF COMMUNICATION TERMINAL 18a | |

FIG.11

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF OWN FORMATION | DEVICE IDENTIFICATION INFORMATION OF COMMUNICATION TERMINAL 18c | FORMATION IDENTIFICATION INFORMATION OF FIRST FORMATION | DEVICE IDENTIFICATION INFORMATION OF COMMUNICATION TERMINAL 18a | |

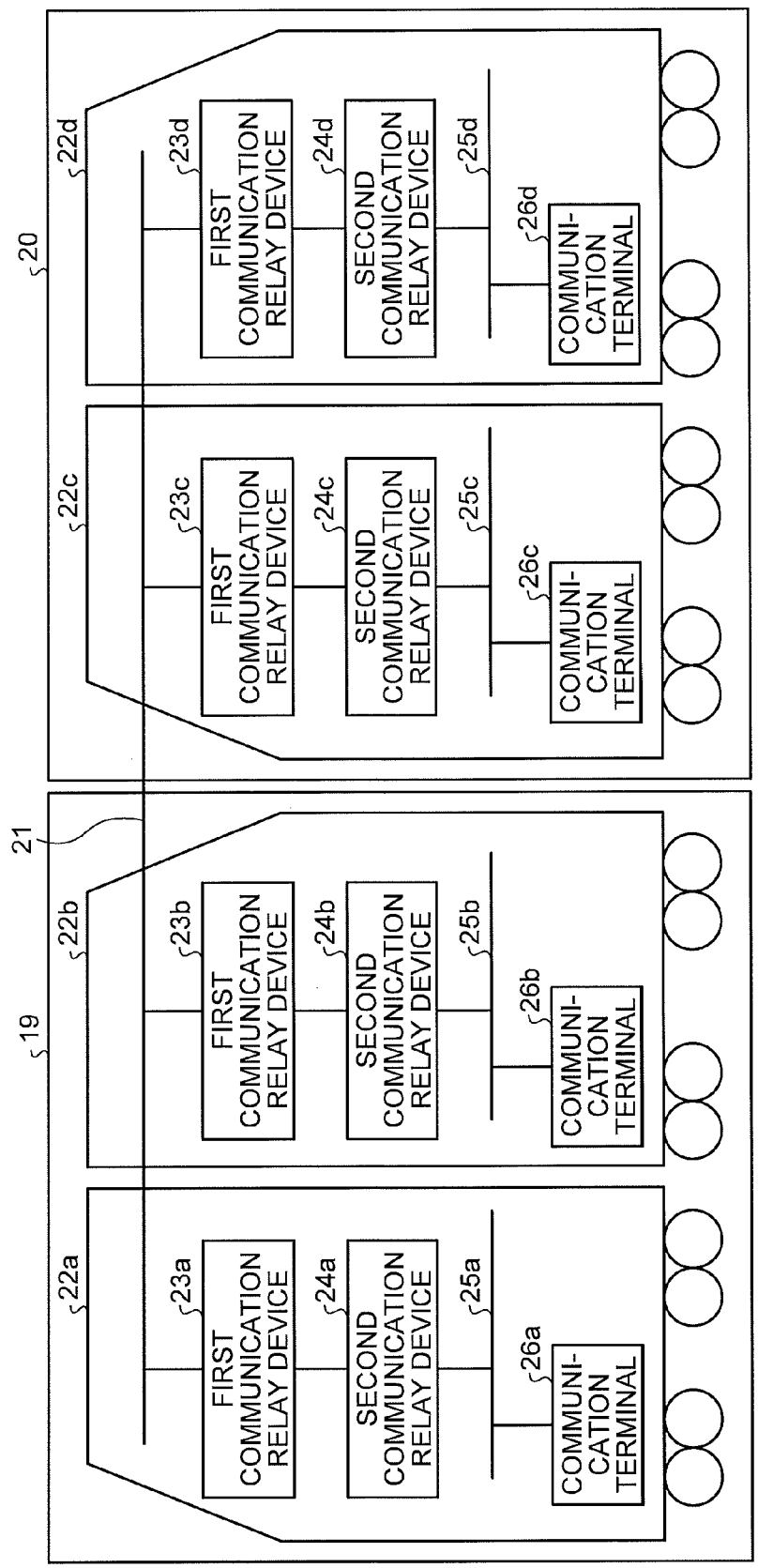

FIG.13

| COMMUNICATION-DESTINATION IDENTIFICATION INFORMATION | | | COMMUNICATION-SOURCE IDENTIFICATION INFORMATION | | | DATA PORTION |
|---|---|---|---|---|---|---|
| FORMATION IDENTIFICATION INFORMATION OF COMMUNICATION DESTINATION | CAR IDENTIFICATION INFORMATION OF COMMUNICATION DESTINATION | DEVICE IDENTIFICATION INFORMATION OF COMMUNICATION DESTINATION | FORMATION IDENTIFICATION INFORMATION OF COMMUNICATION SOURCE | CAR IDENTIFICATION INFORMATION OF COMMUNICATION SOURCE | DEVICE IDENTIFICATION INFORMATION OF COMMUNICATION SOURCE | |

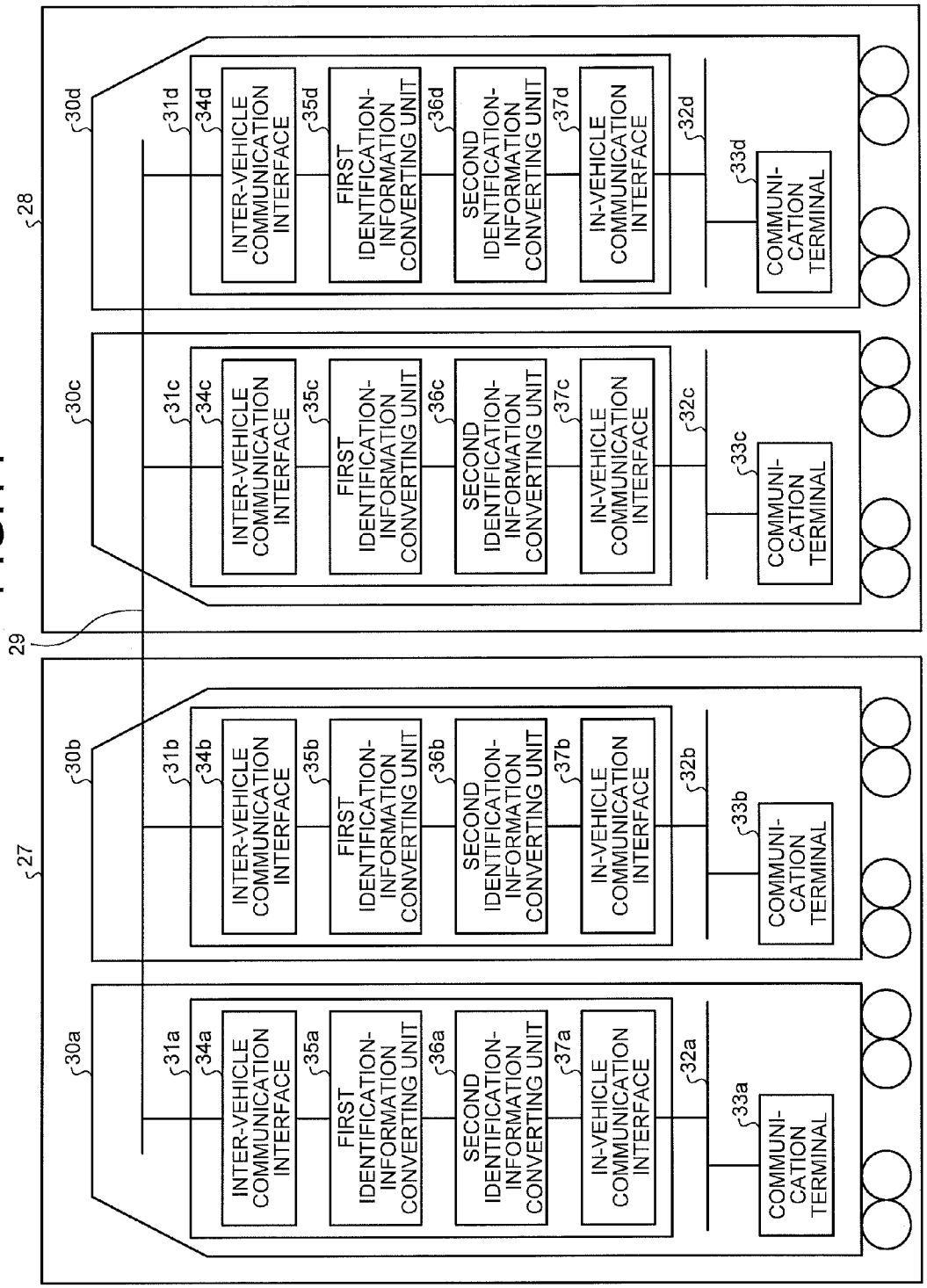

FIG.17

| COMMUNICATION-DESTINATION IDENTIFICATION INFORMATION | | | COMMUNICATION-SOURCE IDENTIFICATION INFORMATION | | | DATA PORTION |
|---|---|---|---|---|---|---|
| FORMATION IDENTIFICATION INFORMATION OF COMMUNICATION DESTINATION | CAR IDENTIFICATION INFORMATION OF COMMUNICATION DESTINATION | DEVICE IDENTIFICATION INFORMATION OF COMMUNICATION DESTINATION | FORMATION IDENTIFICATION INFORMATION OF COMMUNICATION SOURCE | CAR IDENTIFICATION INFORMATION OF COMMUNICATION SOURCE | DEVICE IDENTIFICATION INFORMATION OF COMMUNICATION SOURCE | |

FIG.18

| COMMUNICATION-DESTINATION IDENTIFICATION INFORMATION | | COMMUNICATION-SOURCE IDENTIFICATION INFORMATION | | | DATA PORTION |
|---|---|---|---|---|---|
| FORMATION IDENTIFICATION INFORMATION OF COMMUNICATION DESTINATION | CAR IDENTIFICATION INFORMATION OF COMMUNICATION DESTINATION | DEVICE IDENTIFICATION INFORMATION OF COMMUNICATION DESTINATION | FORMATION IDENTIFICATION INFORMATION OF COMMUNICATION SOURCE | IDENTIFICATION INFORMATION INDICATING OWN VEHICLE | DEVICE IDENTIFICATION INFORMATION OF COMMUNICATION TERMINAL 51a | |

FIG.19

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | CAR IDENTIFICATION INFORMATION OF COMMUNICATION DESTINATION | DEVICE IDENTIFICATION INFORMATION OF COMMUNICATION DESTINATION | FORMATION IDENTIFICATION INFORMATION OF COMMUNICATION SOURCE | IDENTIFICATION INFORMATION INDICATING FIRST CAR | DEVICE IDENTIFICATION INFORMATION OF COMMUNICATION TERMINAL 51b | |

FIG.20

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | DEVICE IDENTIFICATION INFORMATION OF COMMUNICATION TERMINAL 51b | FORMATION IDENTIFICATION INFORMATION OF COMMUNICATION SOURCE | DEVICE IDENTIFICATION INFORMATION OF COMMUNICATION TERMINAL 51a | |
| IDENTIFICATION INFORMATION INDICATING OWN VEHICLE | | IDENTIFICATION INFORMATION INDICATING OWN VEHICLE | | |

FIG.21

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | DEVICE IDENTIFICATION INFORMATION OF COMMUNICATION TERMINAL 51b | FORMATION IDENTIFICATION INFORMATION OF COMMUNICATION SOURCE | DEVICE IDENTIFICATION INFORMATION OF COMMUNICATION TERMINAL 51a | |
| IDENTIFICATION INFORMATION INDICATING FIRST CAR | | IDENTIFICATION INFORMATION INDICATING OWN VEHICLE | | |

FIG.22

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | DEVICE IDENTIFICATION INFORMATION OF COMMUNICATION TERMINAL 51a | FORMATION IDENTIFICATION INFORMATION OF COMMUNICATION SOURCE | DEVICE IDENTIFICATION INFORMATION OF COMMUNICATION TERMINAL 51b | |
| IDENTIFICATION INFORMATION INDICATING FIRST CAR | | IDENTIFICATION INFORMATION INDICATING OWN VEHICLE | | |

FIG.23

| COMMUNICATION-DESTINATION IDENTIFICATION INFORMATION | | COMMUNICATION-SOURCE IDENTIFICATION INFORMATION | | DATA PORTION |
|---|---|---|---|---|
| FORMATION IDENTIFICATION INFORMATION OF COMMUNICATION DESTINATION | DEVICE IDENTIFICATION INFORMATION OF COMMUNICATION TERMINAL 51a | FORMATION IDENTIFICATION INFORMATION OF COMMUNICATION SOURCE | DEVICE IDENTIFICATION INFORMATION OF COMMUNICATION TERMINAL 51b | |
| IDENTIFICATION INFORMATION INDICATING OWN VEHICLE | | IDENTIFICATION INFORMATION INDICATING OWN VEHICLE | | |

COMMUNICATION RELAY DEVICE FOR TRAIN AND COMMUNICATION RELAY METHOD FOR TRAIN

TECHNICAL FIELD

The present invention relates to a communication relay device for a train and a communication relay method thereof.

BACKGROUND ART

Conventionally, TCP/IP has been well known as a communication protocol. In TCP/IP, an IP address is used as information to identify each device when communications between devices are performed. That is, when TCP/IP is used, uniquely determined IP addresses are allocated to devices on a network.

When each device transmits communication data to a network, the device transmits the data, attaching a transmission-destination IP address and a transmission-source IP address to the data. When communications are performed using plural networks, a communication relay device connecting the networks performs a path control using a transmission-destination IP address, and transfers communication data to a device that has the transmission-destination IP address.

When a local network is connected to the Internet, an IP address attached to communication data of a device on the local network is converted by a method called Network Address Translation (NAT). A NAT processing unit that performs NAT holds an IP address on the Internet, converts a transmission-source IP address, which is attached to communication data transmitted by a device on a local network and is received by the NAT processing unit, into an IP address on the Internet held by the NAT processing unit, and transmits after conversion the communication data to the Internet. The NAT processing unit also holds an IP address on a local network, converts a transmission-destination IP address, which is attached to communication data received from the Internet, into an IP address of a device on the local network, and transmits after conversion the communication data to the local network. In this way, a device on the local network can communicate with a device on the Internet via the NAT processing unit.

A technique of NAT can be used not only for communications between a local network and the Internet but also for communications between plural local networks having different network addresses (for example, see Nonpatent Literature 1).

Conventionally, to perform communications between devices arranged in vehicles of a train, there has been known a technique of performing communications via a communication relay device by arranging the communication relay device in each vehicle. For example, Patent Document 1 discloses a communication relay device that rewrites relative vehicle-formation numbers of a destination address and a transmission source address of a data communication packet. With this configuration, communications between arbitrary communication terminals installed in vehicles can be continued even when vehicle formations are merged.

Patent Document 1: Japanese Patent Application Laid-open No. 2004-201476

Nonpatent Literature 1: 'Internetworking with TCP/IP', by Douglas E. Comer, Vol. 1, 4th Edition, August 2002, KYORITSU SHUPPAN Co., Ltd.

DISCLOSURE OF INVENTION

Problem to be Solved by the Invention

Consider a situation where TCP/IP is used as a communication protocol for communications between devices installed in vehicles of a train, which has a vehicle formation of plural vehicles. Trains are made up of individually manufactured vehicles. Thus, it is desirable that the same type of devices installed in respective vehicles have the same IP address, from a viewpoint of manufacturing, management, and maintenance of vehicles.

An operation method of using the same IP address for devices in each formation can be considered if vehicles in each formation are not changed around. However, because trains are used such that formations thereof are merged and divided, communications cannot be performed normally when there are devices that have the same IP address at the time of merging. Thus, a method of allocating IP addresses to the all formations that have a possibility to be connected is considered. However, this has a problem in that mergeable and dividable formations are limited by size limitation of an IP address space, and management of an IP address for each device becomes complex.

Consider a situation where network addresses for respective formations are determined and TCP/IP is used. When an operation is performed such that two networks can physically communicate with each other at the time of formation merging, communications using TCP/IP become possible by providing NAT between the two networks. However, two network addresses to be merged need to be different from each other. Although a method of allocating network addresses to the all formations that have a possibility to be merged is considered, this has a problem in that mergeable and dividable formations are limited by size limitation of a network address space, and management of a network address for each formation becomes complex.

The present invention has been made in view of the above problems, and an object of the present invention is to provide a communication relay device for a train and a communication relay method thereof making it possible to perform communications between devices and facilitate management of communication identification information even when communication identification information such as a redundant IP address is given to the same type of devices installed in different vehicles, and making it possible to perform a flexible operation at the time of merging or dividing vehicle formations.

Means for Solving Problem

To solve the problems described above and achieve the object, a communication relay device for a train according to the present invention, which is mounted on a vehicle of a train having a vehicle formation including a plurality of vehicles, connected to an inter-vehicle communication path and to an in-vehicle communication path, and capable of relaying communications between communication terminals installed within own vehicle and communications between communication terminals installed in different vehicles, includes: an inter-vehicle communication interface capable of transmitting and receiving a communication packet via the inter-vehicle communication path; an in-vehicle communication interface capable of transmitting and receiving a communication packet via the in-vehicle communication path; and an identification-information converting unit that sets, when vehicle identification information of a communication destination included in communication-destination identification information of a communication packet received from the in-vehicle communication path via the in-vehicle communication interface indicates other vehicle, vehicle identification information for identifying a position of own vehicle within the vehicle formation as vehicle identification information of a communication source included in communication-source identification information of the communication packet and then transmits the communication packet to the inter-vehicle communication path via the inter-vehicle communication interface, and sets, when vehicle identification information of a communication destination included in communication-destination identification information of a communication packet received from the inter-vehicle communication path via the inter-vehicle communication interface indicates own vehicle, vehicle identification information indicating own vehicle and used in common by each vehicle within the vehicle formation as the vehicle identification information of the communication destination and then transmits the communication packet to the in-vehicle communication path via the in-vehicle communication interface.

Effect of the Invention

According to the present invention, in communications between communication terminals installed in different vehicles within a vehicle formation, vehicle identification information for identifying a position of a vehicle within a formation is attached to communication-destination identification information and communication-source identification information. Thus, a communication destination can be identified and communications can be performed even when the same identification information is used for the same type of communication terminals in each vehicle. Therefore, it is not necessary to set to communication terminals identification information different for each vehicle, and train operations can be performed flexibly.

BRIEF DESCRIPTION OF DRAWINGS

FIG. 3 depicts a structure of a communication packet transmitted and received by communication terminals according to the first embodiment.

FIG. 4 depicts a structure of a communication packet in the first embodiment when a communication terminal of a first car transmits data to a communication terminal of a second car.

FIG. 5 depicts a structure of a communication packet in the first embodiment transmitted from a communication relay device in the first car to an inter-vehicle communication path.

FIG. 6 depicts a structure of a communication packet in the first embodiment received by the communication terminal of the second car.

FIG. 7 is an arrangement diagram of communication relay devices for a train within a train according to a second embodiment of the present invention.

FIG. 8 depicts a structure of a communication packet transmitted and received by communication terminals according to the second embodiment.

FIG. 9 depicts a structure of a communication packet in the second embodiment transmitted from a communication terminal of a first car of a first to a communication terminal of a first car of a second formation.

FIG. 10 depicts a structure of a communication packet in the second embodiment transmitted from a communication relay device in the first car of the first formation to an inter-vehicle communication path.

FIG. 11 depicts a structure of a communication packet in the second embodiment received by the communication terminal of the first car of the second formation.

FIG. 12 is an arrangement diagram of communication relay devices for a train within a formation according to a third embodiment of the present invention.

FIG. 13 depicts a structure of a communication packet transmitted and received by communication terminals of the third embodiment.

FIG. 14 is an arrangement diagram of communication relay devices for a train within a formation according to a fourth embodiment of the present invention.

FIG. 17 depicts a structure of a communication packet transmitted and received by communication terminals of the sixth embodiment.

FIG. 18 is an example of a structure of a communication packet in the sixth embodiment transmitted from a communication terminal 51a.

FIG. 19 is an example of a structure of a communication packet in the sixth embodiment transmitted from a communication terminal 51b.

FIG. 20 is an example of a structure of a communication packet in the sixth embodiment transmitted by the communication terminal 51a to the communication terminal 51b.

FIG. 21 is an example of a structure of a communication packet in the sixth embodiment received by the communication terminal 51b.

FIG. 22 is an example of a structure of a communication packet in the sixth embodiment transmitted by the communication terminal 51b to the communication terminal 51a.

FIG. 23 is an example of a structure of a communication packet in the sixth embodiment received by the communication terminal 51a.

Figure 1:
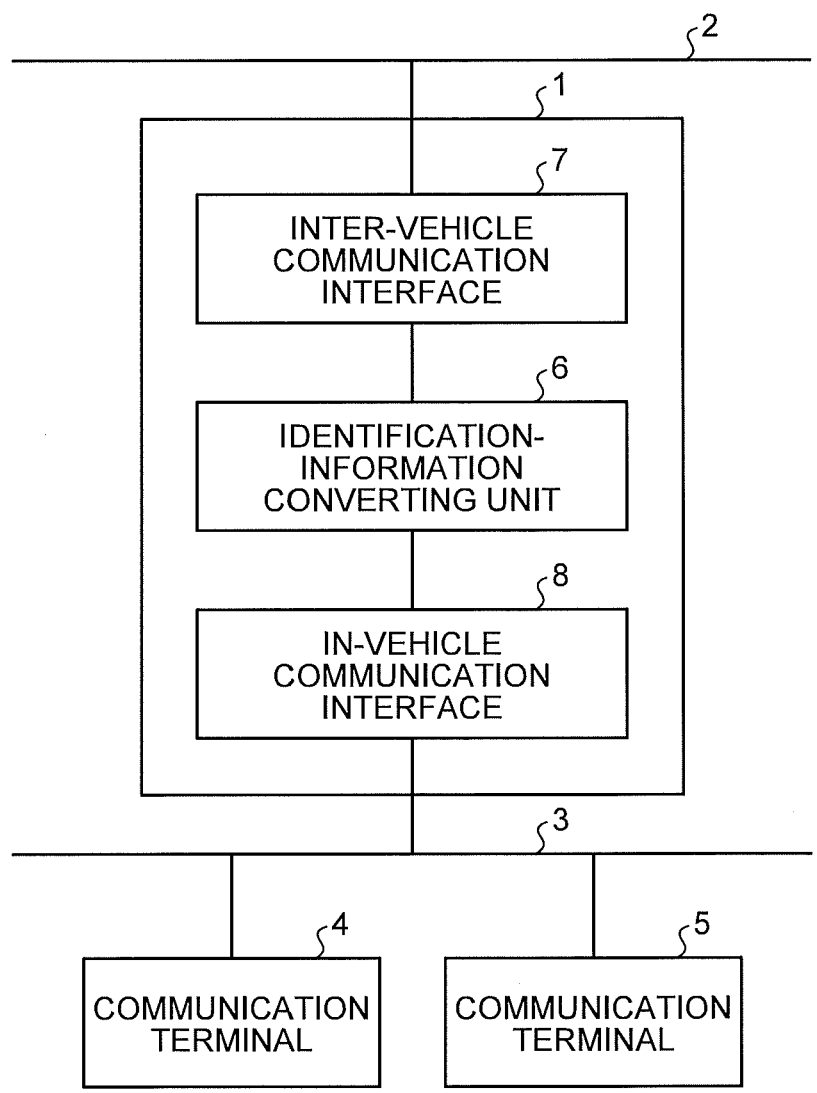
FIG. 1 is a block diagram that includes a configuration of a communication relay device for a train according to a first embodiment of the present invention.

EXPLANATIONS OF LETTERS OR NUMERALS 1, 16a, 16b, 16c, 16d Communication relay device
2, 15 Inter-vehicle communication path
3, 17a, 17b, 17c, 17d In-vehicle communication path
4, 5, 18a, 18b, 18c, 18d Communication terminal
6 Identification-information converting unit
7 Inter-vehicle communication interface
8 In-vehicle communication interface
9, 10, 11 Vehicle
12, 13 Formation
14a, 14b Vehicle
55 Format-information storage unit
56 Format determining unit

BEST MODE(S) FOR CARRYING OUT THE INVENTION

Exemplary embodiments of a communication relay device for a train and a communication relay method for a train according to the present invention will be explained below in detail with reference to the accompanying drawings. The present invention is not limited to the embodiments.

First Embodiment

FIG. 1 is a block diagram that includes a configuration of a communication relay device for a train according to a first embodiment of the present invention. In FIG. 1, a communication relay device 1 is a communication relay device for a train installed within a vehicle, and the communication relay device 1 is connected to an inter-vehicle communication path 2 and is also connected to an in-vehicle communication path 3. For example, communication terminals 4 and 5 are connected to the in-vehicle communication path 3. The inter-vehicle communication path 2 is a communication path to connect vehicles. The in-vehicle communication path 3 is a communication path installed within each vehicle, and connects the communication terminals 4 and 5 within a vehicle and the communication relay device 1. The communication terminals 4 and 5 are examples of various devices capable of transmitting and receiving data installed within a vehicle, and the number of these communication terminals is not limited to two and can be any arbitrary number.

The communication relay device 1 includes an identification-information converting unit 6, an inter-vehicle communication interface 7 connected to the identification-information converting unit 6 and the inter-vehicle communication path 2, and an in-vehicle communication interface 8 connected to the identification-information converting unit 6 and the in-vehicle communication path 3. Communications between the communication terminal 4 and the communication terminal 5 are performed using the in-vehicle communication path 3. When the communication terminal 4 or 5 communicates with a communication terminal installed in other vehicle, the communication terminal 4 or 5 performs communications using the inter-vehicle communication path 2 via the communication relay device 1. The identification-information converting unit 6 is explained below with reference to FIG. 2.

Figure 2:
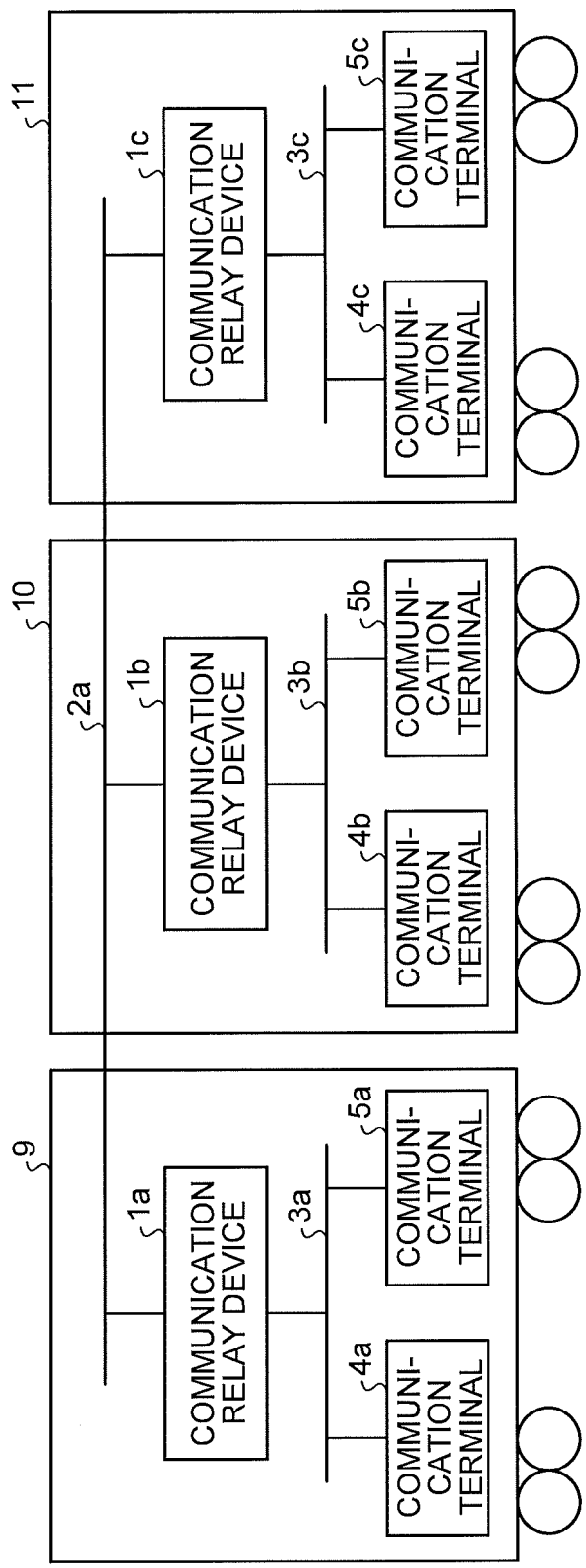
FIG. 2 is an arrangement diagram of communication relay devices in FIG. 1 within a vehicle formation.

FIG. 2 is an arrangement diagram of communication relay devices in FIG. 1 within a vehicle formation. In FIG. 2, vehicles 9, 10, and 11, as three vehicles, are connected in this order to form a vehicle formation (hereinafter, "formation"), for example. Assume that the vehicle 9 is a first car, the vehicle 10 is a second car, and the vehicle 11 is a third car, for the formation.

In the vehicle 9, a communication relay device 1a and communication terminals 4a and 5a are installed, and these are connected by an in-vehicle communication path 3a. The communication relay device 1a has a configuration identical to that of the communication relay device 1 in FIG. 1. Therefore, although not shown, the communication relay device 1a includes an identification-information converting unit 6a, an inter-vehicle communication interface 7a, and an in-vehicle communication interface 8a. A connection mode of the communication relay device 1a, the communication terminals 4a and 5a, and the in-vehicle communication path 3a is also identical to that of the communication relay device 1, the communication terminals 4 and 5, and the in-vehicle communication path 3 in FIG. 1. The communication terminals 4a and 5a are also devices having a communication function capable of transmitting and receiving data.

Similarly, in the vehicle 10, a communication relay device 1b and communication terminals 4b and 5b are installed, and these are connected by an in-vehicle communication path 3b. Although not shown, the communication relay device 1b includes an identification-information converting unit 6b, an inter-vehicle communication interface 7b, and an in-vehicle communication interface 8b. In the vehicle 11, a communication relay device 1c and communication terminals 4c and 5c are installed, and these are connected by an in-vehicle communication path 3c. Similarly, although not shown, the communication relay device 1c includes an identification-information converting unit 6c, an inter-vehicle communication interface 7c, and an in-vehicle communication interface 8c.

The communication relay device 1a in the vehicle 9, the communication relay device 1b in the vehicle 10, and the communication relay device 1c in the vehicle 11 are connected to each other by an inter-vehicle communication path 2a arranged between the vehicles 9, 10, and 11.

FIG. 3 depicts a structure of a communication packet transmitted and received by communication terminals according to the present embodiment. As shown in FIG. 3, the communication packet includes communication-destination identification information, communication-source identification information, and a data portion. The communication-destination identification information includes car identification information corresponding to a car number of a communication destination, and device identification information for identifying a communication terminal within a vehicle of the communication destination. The communication-source identification information includes car identification information corresponding to a car number of a communication source, and device identification information for identifying a communication terminal within a vehicle of the communication source.

The car identification information of a communication destination and that of a communication source destination are explained. For example, in the case of transmitting data from a communication terminal within the first car to a communication terminal within the second car, car identification information of a communication destination included in a communication packet transmitted by the communication terminal within the first car is car identification information indicating the second car (for example, a car number "2"). That is, car identification information of a communication destination is vehicle information for identifying a position of a vehicle within a formation. On the other hand, for car identification information of a communication source, specific car identification information indicating own vehicle (a specific value indicating own vehicle, such as "0" by indicating the own vehicle as the 0-th car) can be used, instead of using car identification information indicating the first car (for example, a car number "1"). That is, at the stage of transmitting a communication packet from a communication terminal of the first car, for own vehicle as a transmission source, specific car identification information indicating the own vehicle is used, instead of using a car number uniquely allocated within a formation. Accordingly, for vehicles other than the first car, when these vehicles indicate own vehicles, the specific car identification information indicating own vehicle can be commonly used. For example, in the case of transmitting and receiving data using the in-vehicle communication path 3 between communication terminals within the same vehicle, specific car identification information indicating the own vehicle is used for both the car identification information of a communication destination and that of a communication source.

The same device identification information (the same value) can be set to the communication terminals 4a, 4b, and 4c, by regarding these communication terminals as the same type of devices. Similarly, the same device identification information (the same value) can be set to the communication terminals 5a, 5b, and 5c, by regarding these, communication terminals as the same type of devices.

An operation in the present embodiment is explained next. A transmission of data from the communication terminal 4a in the vehicle 9 as the first car to the communication terminal 4b in the vehicle 10 as the second car is explained, as an example. A communication packet when the communication terminal 4a installed in the first car transmits data to the communication terminal 4b installed in the second car has a structure shown in FIG. 4.

As shown in FIG. 4, communication-destination identification information of the communication packet transmitted from the communication terminal 4a includes car identification information indicating the second car (car identification information of the second car), and communication-terminal identification information indicating the communication terminal 4b (device identification information of the communication terminal 4b).

Communication-source identification information of the communication packet includes specific car identification information indicating own vehicle (car identification information of the own car), and communication-terminal identification information indicating the communication terminal 4a (device identification information of the communication terminal 4a). The specific car identification information indicating own vehicle (car identification information of the own car) is the "0"-th car indicating the own vehicle. The communication terminal 4a transmits the communication packet to the in-vehicle communication path 3a.

The communication relay device 1a in the first car receives the communication packet from the in-vehicle communication path 3a using the in-vehicle communication interface 8a of the communication relay device 1a itself. When finding a car identification number indicating other than the own vehicle in the communication-destination identification information of the communication packet received, the identification-information converting unit 6a in the communication relay device 1a stores the car identification number indicating the first car (the car identification information of the first car) into the car identification information of the communication-source identification information of the communication packet received. The communication relay device 1a transmits a communication packet in which communication-source identification information is converted, to the inter-vehicle communication path 2a using the inter-vehicle communication interface 7a. FIG. 5 depicts a structure of a communication packet transmitted from the communication relay device 1a to the inter-vehicle communication path 2a.

The communication relay device 1b in the second car receives the communication packet from the inter-vehicle communication path 2a using the inter-vehicle communication interface 7b of the communication relay device 1b itself. When finding a car identification number of the second car as the own vehicle in the communication-destination identification information of the communication packet received, the identification-information converting unit 6b in the communication relay device 1b stores the specific car identification information indicating the own vehicle (the car number of the own car) into the car identification information of the communication-destination identification information of the communication packet received. The communication relay device 1b transmits a communication packet in which communication-destination identification information is converted, to the in-vehicle communication path 3b using the in-vehicle communication interface 8b. FIG. 6 depicts a structure of a communication packet transmitted from the communication relay device 1b to the in-vehicle communication path 3b. This structure is also a structure of a communication packet received by the communication terminal 4b.

The communication terminal 4b in the second car receives the communication packet that includes device identification of a communication destination indicating the communication terminal 4b itself from the in-vehicle communication path 3b. In this case, the communication packet received by the communication terminal 4b has a structure shown in FIG. 6. Therefore, the communication terminal 4b can understand that the communication terminal 4a installed in the first car is the transmission source.

The above-mentioned communications can be performed in a situation where path information is not present, because each of the communication relay devices 1a to 1c has a unit (not shown) that obtains car number information. That is, because the identification-information converting units 6a, 6b, and 6c convert car identification information based on car number information of a car in which the converting unit itself is installed, the identification-information converting units 6a, 6b, and 6c need to obtain the car number information. This can be dealt with through a method of obtaining car number information in which the communication relay devices 1a to 1c individually record car number information when a formation is formed.

In the present embodiment, communication-destination identification information and communication-source identification information can be IP addresses. An example of this method is explained.

An IP address can be expressed by an integer of four bytes, for example. For example, the first and second bytes are fixed values, the third byte is a car number, and the fourth byte is an integer (a terminal number) to identify a communication terminal. For a value of car identification information of own car, zero (0) is used, for example. A communication relay device installed in each vehicle has each car number set as car number information, at the time of formation manufacturing.

By performing the above setting, communication terminals can be individually identified even when IP addresses are determined by allocating the same terminal number to the same type of communication terminals in each car, and communications can be performed between vehicles. That is, it is possible to provide a system of communications on a network that uses device identification information such as redundant IP addresses for the same type of devices installed in different vehicles within a formation. Consequently, a communication terminal is not required to be set with device identification information different for each vehicle, and flexible train operations can be handled.

In the present embodiment, although an example of installing one communication relay device in each vehicle is explained, two or more communication relay devices can be installed within one vehicle.

A communication relay device simultaneously managing two or more vehicles can be installed. In this case, identification information is set such that a communication relay device identifies a range of communication terminals communicating by using an in-vehicle communication interface.

Second Embodiment

FIG. 7 is an arrangement diagram of communication relay devices for a train within a train according to a second embodiment of the present invention. In FIG. 7, the train includes two formations of a formation 12 and a formation 13, for example. The formation 12 is a first formation, and includes a vehicle 14a and a vehicle 14b, for example. The vehicle 14a is a first car of the first formation, and the vehicle 14b is a second car of the first formation. The formation 13 is a second formation, and includes a vehicle 14c and a vehicle 14d, for example. The vehicle 14c is the first car of the second formation, and the vehicle 14d is the second car of the second formation. The number of formations and the number of vehicles in each formation are examples, and these numbers are not limited thereto.

A communication relay device 16a is installed in the vehicle 14a, a communication relay device 16b is installed in the vehicle 14b, a communication relay device 16c is installed in the vehicle 14c, and a communication relay device 16d is installed in the vehicle 14d. An inter-vehicle communication path 15 is a communication path connecting vehicles. The communication relay devices 16a, 16b, 16c, and 16d are connected to the inter-vehicle communication path 15, and can communicate with each other using the inter-vehicle communication path 15. The inter-vehicle communication path 15 also works as an inter-formation communication path between the first formation and the second formation, that is, between the vehicle 14b and the vehicle 14c.

A communication terminal 18a is installed in the vehicle 14a, and the communication terminal 18a is connected to the communication relay device 16a via an in-vehicle communication path 17a. Similarly, a communication terminal 18b is installed in the vehicle 14b, and the communication terminal 18b is connected to the communication relay device 16b via an in-vehicle communication path 17b. Similarly, a communication terminal 18c is installed in the vehicle 14c, and the communication terminal 18c is connected to the communication relay device 16c via an in-vehicle communication path 17c. Similarly, a communication terminal 18d is installed in the vehicle 14d, and the communication terminal 18d is connected to the communication relay device 16d via an in-vehicle communication path 17d. The number of communication terminals installed in each vehicle is an example, and plural communication terminals can be connected as shown in FIG. 2.

The configuration of each of the communication relay devices 16a, 16b, 16c, and 16d is identical to the configuration of the communication relay device 1 according to the first embodiment. That is, each communication relay device includes an inter-vehicle communication interface, an identification-information converting unit, and an in-vehicle communication interface.

FIG. 8 depicts a structure of a communication packet transmitted and received by communication terminals according to the present embodiment. As shown in FIG. 8, the communication packet includes communication-destination identification information, communication-source identification information, and a data portion. The communication-destination identification information includes formation identification information corresponding to the formation number of a communication destination, and device identification information for identifying a communication terminal within a formation of the communication destination. The communication-source identification information includes formation identification information corresponding to the formation number of a communication source, and device identification information for identifying a communication terminal within a formation of the communication source.

When communication terminals performing communications are both within the same formation, specific identification information indicating own formation (for example, a value of a 0 (zero) formation as the own formation) is set as the formation identification information. This corresponds to the case of using specific car identification information indicating own vehicle for car identification information when communication terminals perform communications using the in-vehicle communication path 3 according to the first embodiment. For example, when the communication terminal 18a transmits a communication packet to the communication terminal 18b, in the communication packet, information corresponding to the own formation is used for the formation identification information of a communication destination, information corresponding to the communication terminal 18b is used for the device identification information of a communication destination, information corresponding to the own formation is used for the formation identification information of a communication source, and information corresponding to the communication terminal 18a is used for the device identification information of a communication source.

When communication terminals performing communications are within mutually different formations, information indicating a formation of a transmission destination is set as the formation identification information of a communication destination, and information indicating own formation is set as the formation identification information of a communication source. For example, when the communication terminal 18a transmits a communication packet to the communication terminal 18c, in the communication packet, information corresponding to the second formation is used as the formation identification information of a communication destination, information corresponding to the communication terminal 18c is used for the device identification information of a communication destination, information corresponding to the own formation is used for the formation identification information of a communication source, and information corresponding to the communication terminal 18a is used for the device identification information of a communication source. FIG. 9 depicts a structure of the communication packet. An operation of the present embodiment is explained below by exemplifying a case of transmitting a communication packet from the communication terminal 18a to the communication terminal 18c.

The communication relay device 16a in the first car of the first formation receives the communication packet from the in-vehicle communication path 17a using the in-vehicle communication interface of the communication relay device 16a itself. When finding formation identification information indicating other than the own formation in the communication-destination identification information of the communication packet received, the identification-information converting unit in the communication relay device 16a converts the formation identification information of the communication-source identification information of the communication packet received into formation identification information indicating the first formation (formation identification information of the first formation). The communication relay device 16a transmits the communication packet, in which the communication-source identification information is converted, to the inter-vehicle communication path 15 using the inter-vehicle communication interface of the communication relay device 16a itself. FIG. 10 depicts a structure of the communication packet in this case.

The communication relay device 16c in the first car of the second formation receives the communication packet from the inter-vehicle communication path 15 using the inter-vehicle communication interface of the communication relay device 16c itself. When finding formation identification information of the second formation as the own formation in the communication-destination identification information of the communication packet received, the identification-information converting unit in the communication relay device 16c converts the formation identification information of the communication-destination identification information of the communication packet received into specific formation identification information indicating the own formation (formation identification information of the own formation). The communication relay device 16c transmits the communication packet, in which the communication-destination identification information is converted, to the in-vehicle communication path 17c using the in-vehicle communication interface of the communication relay device 16c itself. FIG. 11 depicts a structure of the communication packet in this case.

The communication terminal 18c in the first car of the second formation receives the communication packet that includes device identification information of a communication destination indicating the communication terminal 18c from the in-vehicle communication path 17c. In this case, the communication packet received by the communication terminal 18c has the structure shown in FIG. 11. Therefore, the communication terminal 18c can understand that the transmission source of the received communication packet is the communication terminal 18a installed in the first formation.

The above-mentioned communications can be performed in a situation where path information is not present, because each of the communication relay devices 16a to 16f has a unit (not shown) that obtains formation information. That is, because each formation-information converting unit in the communication relay devices 16a to 16d converts formation identification information based on formation information of a car in which the converting unit itself is installed, the identification-information converting unit needs to obtain the formation information.

In the present embodiment, communication-destination identification information and communication-source identification information can be IP addresses, in a similar manner to that of the first embodiment.

According to the present embodiment, communications can be performed even when redundant device-identification information is used in the same type of devices installed in vehicles of different formations within a train. Consequently, a communication system can be easily constructed at the time of merging or dividing formations, flexible train operations can be handled.

Third Embodiment

FIG. 12 is an arrangement diagram of communication relay devices for a train within a train according to a third embodiment of the present invention. In FIG. 12, the train includes two formations of a formation 19 and a formation 20, for example. The formation 19 is a first formation, and includes a vehicle 22a and a vehicle 22b, for example. The vehicle 22a is a first car of the first formation, and the vehicle 22b is a second car of the first formation. The formation 20 is a second formation, and includes a vehicle 22c and a vehicle 22d, for example. The vehicle 22c is the first car of the second formation, and the vehicle 22d is the second car of the second formation. The number of formations and the number of vehicles in each formation are examples, and these numbers are not limited thereto.

A first communication relay device 23a, a second communication relay device 24a connected to the first communication relay device 23a, a communication terminal 26a, and an in-vehicle communication path 25a connecting the second communication relay device 24a and the communication terminal 26a are installed in the vehicle 22a. Similarly, a first communication relay device 23b, a second communication relay device 24b, a communication terminal 26b, and an in-vehicle communication path 25b are installed in the vehicle 22b. A first communication relay device 23c, a second communication relay device 24c, a communication terminal 26c, and an in-vehicle communication path 25c are installed in the vehicle 22c. A first communication relay device 23d, a second communication relay device 24d, a communication terminal 26d, and an in-vehicle communication path 25d are installed in the vehicle 22d. The number of communication terminals installed in each vehicle is an example, and plural communication terminals can be connected as shown in FIG. 2.

An inter-vehicle communication path 21 is a communication path connecting vehicles. The first communication relay devices 23a, 23b, 23c, and 23d are connected to the inter-vehicle communication path 21, and can communicate with each other using the inter-vehicle communication path 21. The inter-vehicle communication path 21 also works as an inter-formation communication path between the first formation and the second formation, that is, between the vehicle 22b and the vehicle 23c.

FIG. 13 depicts a structure of a communication packet transmitted and received by communication terminals of the present embodiment. As shown in FIG. 13, the communication packet includes communication-destination identification information, communication-source identification information, and a data portion. The communication-destination identification information includes formation identification information corresponding to the formation number of a communication destination, car identification information corresponding to a car number of the communication destination, and device identification information for identifying a communication terminal within a vehicle of the communication destination. The communication-source identification information includes formation identification information corresponding to the formation number of a communication source, car identification information corresponding to a car number of the communication source, and device identification information for identifying a communication terminal within a vehicle of the communication source.

Each of the first communication relay devices 23a, 23b, 23c, and 23d has an identification-information converting unit that converts formation identification information. Each of the first communication relay devices 23a, 23b, 23c, and 23d also has an inter-vehicle communication interface. Each of the second communication relay devices 24a, 24b, 24c, and 24d has an identification-information converting unit that converts car identification information. Each of the second communication relay devices 24a, 24b, 24c, and 24d also has an in-vehicle communication interface.

Each of the first communication relay devices 23a, 23b, 23c, and 23d converts the formation identification information explained in the second embodiment, and each of the second communication relay devices 24a, 24b, 24c, and 24d converts the car identification information explained in the first embodiment. By converting the car identification information, each communication terminal can communicate using unique identification information within the formation even when identification information of a communication terminal installed in each vehicle is used in other car and when a formation is constructed by combining vehicles. Each communication terminal can communicate using unique identification information even when plural formations are combined and connected to operate as a train. That is, even when the same device identification information is used in communication terminals of the same device between vehicles within a formation or between formations, each communication terminal can communicate using unique identification information by attaching formation identification information and car identification information to a communication packet and by properly converting these pieces of information. In the present embodiment, a car installed with each communication terminal can be assigned by plural (two, in this case) pieces of identification information at the time of assigning each communication terminal to perform communications, in a similar manner to that of the first embodiment. That is, cars can be assigned using an expression of a specific car identification number indicating own vehicle or a car number within a formation of the own vehicle to each communication terminal, and a communication relay device converts these pieces of identification information. This also applies to formation identification information, and each communication terminal can be accessed by plural methods in this way. Other configurations, operations, and effects of the third embodiment are identical to those of the first and second embodiments.

Fourth Embodiment

FIG. 14 is an arrangement diagram of communication relay devices for a train within a train according to a fourth embodiment of the present invention. In FIG. 14, the train includes two formations of a formation 27 and a formation 28, for example. The formation 27 is a first formation, and includes a vehicle 30a and a vehicle 30b, for example. The vehicle 30a is a first vehicle (a first car) in the first formation, and the vehicle 30b is a second vehicle (a second car) in the first formation. The formation 28 is a second formation, and includes a vehicle 30c and a vehicle 30d, for example. The vehicle 30c is a first vehicle (the first car) in the second formation, and the vehicle 30d is a second vehicle (the second car) in the second formation. The number of formations and the number of vehicles in each formation are examples, and these numbers are not limited thereto.

A communication relay device 31a, a communication terminal 33a, and an in-vehicle communication path 32a connecting the communication relay device 31a and the communication terminal 33a are installed in the vehicle 30a. A communication relay device 31b, a communication terminal 33b, and an in-vehicle communication path 32b connecting the communication relay device 31b and the communication terminal 33b are installed in the vehicle 30b. A communication relay device 31c, a communication terminal 33c, and an in-vehicle communication path 32c connecting the communication relay device 31c and the communication terminal 33c are installed in the vehicle 30c. A communication relay device 31d, a communication terminal 33d, and an in-vehicle communication path 32d connecting the communication relay device 31d and the communication terminal 33d are installed in the vehicle 30d. The number of communication terminals installed in each vehicle is an example, and plural communication terminals can be connected as shown in FIG. 2.

An inter-vehicle communication path 29 is a communication path connecting vehicles. The communication relay devices 31a, 31b, 31c, and 31d are connected to the inter-vehicle communication path 29, and can communicate with each other using the inter-vehicle communication path 29. The inter-vehicle communication path 29 also works as an inter-formation communication path between the first formation and the second formation, that is, between the vehicle 30b and the vehicle 30c.

The communication relay device 31a includes an inter-vehicle communication interface 34a, a first identification-information converting unit 35a, a second identification-information converting unit 36a, and an in-vehicle communication interface 37a. Similarly, the communication relay device 31b includes an inter-vehicle communication interface 34b, a first identification-information converting unit 35b, a second identification-information converting unit 36b, and an in-vehicle communication interface 37b. The communication relay device 31c includes an inter-vehicle communication interface 34c, a first identification-information converting unit 35c, a second identification-information converting unit 36c, and an in-vehicle communication interface 37c. The communication relay device 31d includes an inter-vehicle communication interface 34d, a first identification-information converting unit 35d, a second identification-information converting unit 36d, and an in-vehicle communication interface 37d.

Each of the first identification-information converting units 35a, 35b, 35c, and 35d converts formation identification information, and performs an operation equivalent to that of the identification-information converting units of the first communication relay devices 23a, 23b, 23c, and 23d according to the third embodiment. Each of the second identification-information converting units 36a, 36b, 36c, and 36d converts car identification information, and performs an operation equivalent to that of the identification-information converting units of the second communication relay devices 24a, 24b, 24c, and 24d according to the third embodiment.

For example, a case that the communication terminal 33a installed in the first vehicle 30a in the first formation transmits data to the communication terminal 33c installed in the first vehicle 30c in the second formation is explained. Communication-destination identification information of a communication packet transmitted from the communication terminal 33a includes formation identification information of the second formation as formation identification information of a communication destination, car identification information of the first car as car identification information of the communication destination, and device identification information of the communication terminal 33c as device identification information of the communication destination. Communication-source identification information of a communication packet transmitted from the communication terminal 33a includes formation identification information of the own formation as formation identification information of a communication source, car identification information of the own car as car identification information of the communication source, and device identification information of the communication terminal 33a as device identification information of the communication source. A communication packet transmitted from the communication terminal 33a passes through the in-vehicle communication path 32a, and is received by the communication relay device 31a via the in-vehicle communication interface 37a. In the communication relay device 31a, when the second identification-information converting unit 36a finds formation identification information other than the own formation or finds car identification information other than the own car in the communication-destination identification information of the communication packet received, the second identification-information converting unit 36a converts the car identification information of the communication source of the communication packet received, from the car identification information of the own car into the car identification information of the first car, and outputs the car identification information of the first car to the first identification-information converting unit 35a. When the first identification-information converting unit 35a finds formation identification information other than the own formation in the communication-destination identification information of the communication packet output from the second identification-information converting unit 36a, the first identification-information converting unit 35a converts the formation identification information of the communication source of the communication packet, from the formation identification information of the own formation into the formation identification information of the first formation, and transmits the communication packet to the inter-vehicle communication path 29 via the inter-vehicle communication interface 34a. The communication relay device 31c in the first vehicle 30c in the second formation receives the communication packet from the inter-vehicle communication path 29 via the inter-vehicle communication interface 34c. In the communication relay device 31c, when the first identification-information converting unit 35c finds identification information of the second formation as the own formation in the communication-destination identification information of the communication packet received, the first identification-information converting unit 35c converts the formation identification information of the communication destination of the communication packet received, from the formation identification information of the second formation into the formation identification information of the own formation, and outputs the formation identification information of the own formation to the second identification-information converting unit 36c. When the second identification-information converting unit 36c finds car identification information of the first car as the own car in the communication-destination identification information of the communication packet output from the first identification-information converting unit 35c, the second identification-information converting unit 36c converts the car identification information of the communication destination of the communication packet, from the car identification information of the first car into the car identification information of the own car, and transmits the communication packet to the in-vehicle communication path 32c via the in-vehicle communication interface 37c. The communication terminal 33c receives the communication packet that includes the device identification information of the communication destination indicating the communication terminal 33c itself from the in-vehicle communication path 32c.

As an example, a case that the communication terminal 33a installed in the first vehicle 30a in the first formation transmits data to the communication terminal 33d installed in the second vehicle 30d in the second formation can be also explained in a similar manner. For example, when the communication terminal 33a installed in the first vehicle 30a in the first formation transmits data to the communication terminal 33b installed in the second vehicle 30b in the same formation, this corresponds to a case of not performing communications between formations. Therefore, this operation is identical to that of the first embodiment. The second identification-information converting units 36a and 36b convert vehicle identification information, and the first identification-information converting units 35a and 35b do not convert formation identification information.

In the present embodiment, the first communication relay device and the second communication relay device according to the third embodiment are integrated within each vehicle and are used as one communication relay device. Other configurations, operations, and effects of the third embodiment are identical to those of the third embodiment.

Fifth Embodiment

Figure 15:
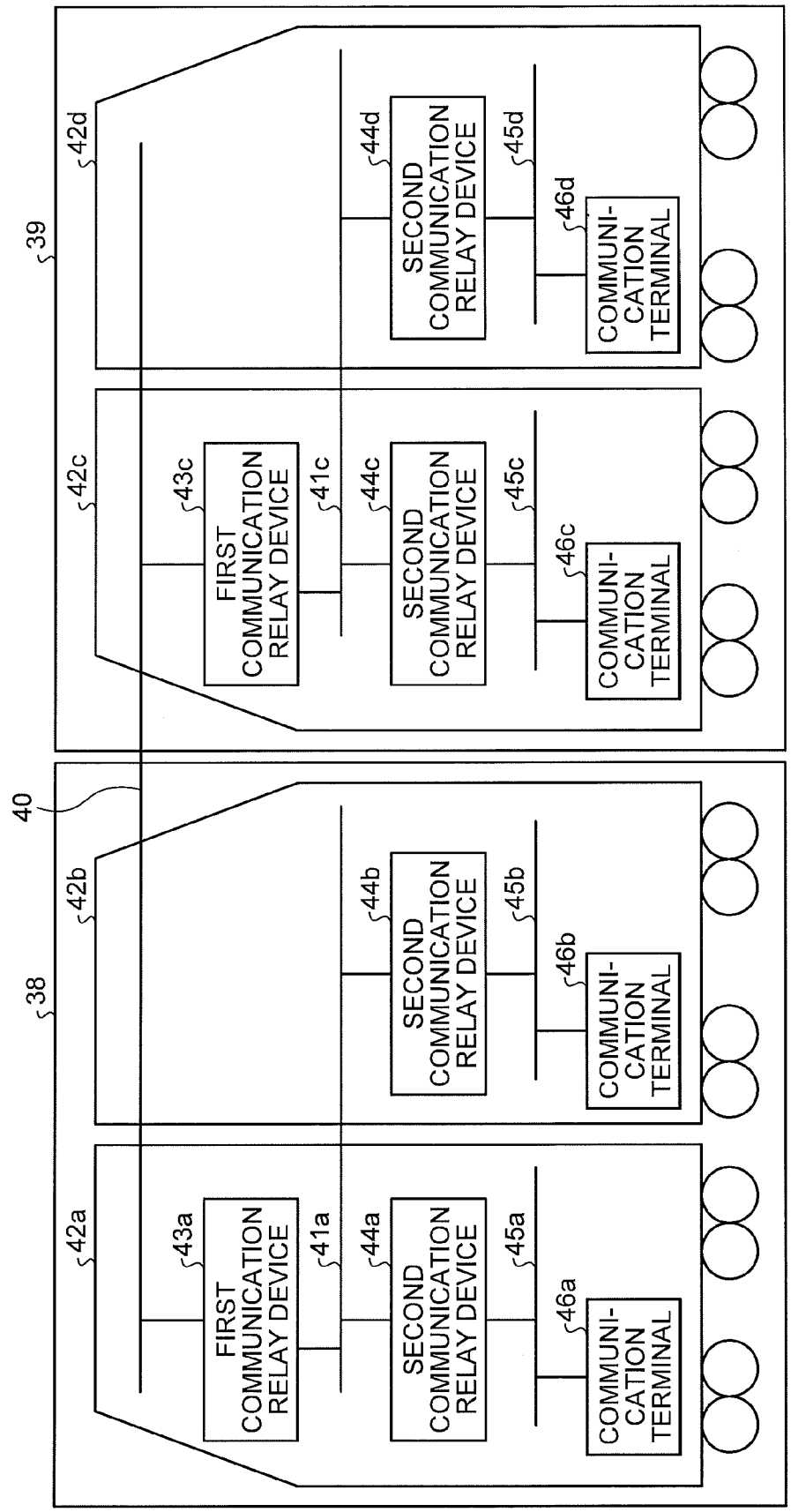
FIG. 15 is an arrangement diagram of communication relay devices for a train within a formation according to a fifth embodiment of the present invention.

FIG. 15 is an arrangement diagram of communication relay devices for a train within a train according to a fifth embodiment of the present invention. In FIG. 15, the train includes two formations of a formation 38 and a formation 39, for example. The formation 38 is a first formation, and includes a vehicle 42a and a vehicle 42b, for example. The vehicle 42a is a first vehicle (a first car) in the first formation, and the vehicle 42b is a second vehicle (a second car) in the first formation. The formation 39 is a second formation, and includes a vehicle 42c and a vehicle 42d, for example. The vehicle 42c is a first vehicle (the first car) in the second formation, and the vehicle 42d is a second vehicle (the second car) in the second formation. The number of formations and the number of vehicles in each formation are examples, and these numbers are not limited thereto.

A second communication relay device 44a, a communication terminal 46a, and an in-vehicle communication path 45a connecting the second communication relay device 44a and the communication terminal 46a are installed in the vehicle 42a. Similarly, a second communication relay device 44b, a communication terminal 46b, and an in-vehicle communication path 45b connecting the second communication relay device 44b and the communication terminal 46b are installed in the vehicle 42b. A second communication relay device 44c, a communication terminal 46c, and an in-vehicle communication path 45c connecting the second communication relay device 44c and the communication terminal 46c are installed in the vehicle 42c. A second communication relay device 44d, a communication terminal 46d, and an in-vehicle communication path 45d connecting the second communication relay device 44d and the communication terminal 46d are installed in the vehicle 42d. In the formations, the second communication relay devices 44a, 44b, 44c, and 44d perform operations identical to that of the communication relay device according to the first embodiment. Therefore, each of these second communication relay devices has an identification-information converting unit that converts car identification information. The number of communication terminals installed in each vehicle is an example, and plural communication terminals can be connected as shown in FIG. 2.

A first communication relay device 43a is further installed in the vehicle 42a, and the first communication relay device 43a is connected to the second communication relay devices 44a and 44b via an inter-vehicle communication path 41a of the first formation. The inter-vehicle communication path 41a is a communication path arranged between vehicles within the first formation. A first communication relay device 43c is further installed in the vehicle 42c, and the first communication relay device 43c is connected to the second communication relay devices 44c and 44d via an inter-vehicle communication path 41c of the second formation. The inter-vehicle communication path 41c is a communication path arranged between vehicles within the second formation.

An inter-formation communication path 40 is a communication path connecting formations. The first communication relay devices 43a and 43c are connected to the inter-formation communication path 40, and can communicate with each other using the inter-formation communication path 40. The configurations such that at each of the first communication relay devices 43a and 43c and the second communication relay devices 44a, 44b, 44c, and 44d has a communication interface to a connected communication path is identical to that of the first to fourth embodiments.

This is explained in detail. Each of the first communication relay devices 43a and 43c includes an inter-formation communication interface, and can communicate with each other between the formations via the inter-formation communication path 40 using each inter-formation communication interface. The first communication relay device 43a includes an inter-vehicle communication interface, and can communicate between vehicles via the inter-vehicle communication path 41a using this inter-vehicle communication interface. Similarly, the first communication relay device 43c includes an inter-vehicle communication interface, and can communicate between vehicles via the inter-vehicle communication path 41c using this inter-vehicle communication interface. Each of the second communication relay devices 44a and 44b includes an inter-vehicle communication interface, and can communicate between vehicles via the inter-vehicle communication path 41a using each inter-vehicle communication interface. Similarly, each of the second communication relay devices 44c and 44d includes an inter-vehicle communication interface, and can communicate between vehicles via the inter-vehicle communication path 41c using each inter-vehicle communication interface. The second communication relay device 44a includes an in-vehicle communication interface, and can communicate within the vehicle via the in-vehicle communication path 45a using this in-vehicle communication interface. Each of the second communication relay devices 44b, 44c, and 44d also includes an in-vehicle communication interface in a similar manner to that of the second communication relay device 44a, and also operates in a similar manner to that of the second communication relay device 44a, and therefore explanations thereof will be omitted.

In the present embodiment, a structure of a communication packet explained in the third embodiment, that is, the structure of the communication packet shown in FIG. 3, is used. Each of the first communication relay devices 43a and 43c has an identification-information converting unit that converts formation identification information. As explained above, each of the second communication relay devices 44a, 44b, 44c, and 44d includes an identification-information converting unit that converts car identification information. These are identical to the conversions of car identification information and conversions of formation identification information explained in the first to fourth embodiments, and therefore detailed explanations thereof will be omitted.

The first communication relay device 43a receives a communication packet, which is to be communicated between formations, out of communication packets transmitted from the second communication relay device 44a or 44b to the inter-vehicle communication path 41a (that is, a communication packet transmitted to the second formation). The first communication relay device 43a converts formation identification information, and transmits this communication packet to the inter-formation communication path 40. The first communication relay device 43a converts formation identification information of a communication packet to the first formation out of communication packets received from the inter-formation communication path 40, and transmits the communication packet to the inter-vehicle communication path 41a. The first communication relay device 43c receives a communication packet communicated between formations out of communication packets transmitted from the second communication relay device 44c or 44d to the inter-vehicle communication path 41c (that is, a communication packet transmitted to the first formation). The first communication relay device 43c converts formation identification information, and transmits this communication packet to the inter-formation communication path 40. The first communication relay device 43c converts formation identification information of a communication packet to the second formation out of communication packets received from the inter-formation communication path 40, and transmits the communication packet to the inter-vehicle communication path 41c. The first communication relay devices 43a and 43c convert identification information of a communication packet between the formations by using the method explained in the second embodiment.

As an example, a case that the communication terminal 46a installed in the first vehicle 42a in the first formation transmits data to the communication terminal 46c installed in the first vehicle 42c in the second formation is explained. Communication-destination identification information of a communication packet transmitted from the communication terminal 46a includes formation identification information of the second formation as formation identification information of a communication destination, car identification information of the first car as car identification information of the communication destination, and device identification information of the communication terminal 46c as device identification information of the communication destination. Communication-source identification information of a communication packet transmitted from the communication terminal 46a includes formation identification information of the own formation as formation identification information of a communication source, car identification information of the own car as car identification information of the communication source, and device identification information of the communication terminal 46a as device identification information of the communication source. A communication packet transmitted from the communication terminal 46a passes through the in-vehicle communication path 45a, and is received by the second communication relay device 44a via the in-vehicle communication interface. When the second communication relay device 44a finds formation identification information other than the own formation or finds car identification information other than the own car in the communication-destination identification information of the communication packet received, the second communication relay device 44a converts the car identification information of the communication source of the communication packet received, from the car identification information of the own car into the car identification information of the first car, using the identification-information converting unit, and transmits the communication packet to the inter-vehicle communication path 41a via the inter-vehicle communication interface. The first communication relay device 43a receives the communication packet from the inter-vehicle communication path 41a. When the first communication relay device 43a finds formation identification information other than the own formation in the communication-destination identification information of the communication packet received, the first communication relay device 43a converts the formation identification information of the communication source of the communication packet received, from the formation identification information of the own formation into the formation identification information of the first formation, using the identification-information converting unit, and transmits the communication packet to the inter-formation communication path 40 via the inter-formation communication interface. The first communication relay device 43c in the first vehicle 42c in the second formation receives the communication packet from the inter-formation communication path 40 via the inter-formation communication interface. When the first communication relay device 43c finds identification information of the second formation as the own formation in the communication-destination identification information of the communication packet received, the first communication relay device 43c converts the formation identification information of the communication destination of the communication packet received, from the formation identification information of the second formation into the formation identification information of the own formation, using the identification converting unit, and transmits the communication packet to the inter-vehicle communication path 41c via the inter-vehicle communication interface. The second communication relay device 44c in the vehicle 42c receives the communication packet via the inter-vehicle communication interface. When the second communication relay device 44c finds car identification information of the first car as the own car in the communication-destination identification information of the communication packet received, the second communication relay device 44c converts the car identification information of the communication destination of the communication packet received, from the car identification information of the first car into the car identification information of the own car, using the identification converting unit, and transmits the communication packet to the in-vehicle communication path 45c via the in-vehicle communication interface. The communication terminal 46c receives the communication packet that includes the device identification information of the communication destination indicating the communication terminal 46c itself from the in-vehicle communication path 45c.

Other operations of the fifth embodiment are identical to those of the first to fourth embodiments, and the present embodiment can achieve effects identical to those of the third and fourth embodiments.

Sixth Embodiment

Figure 16:
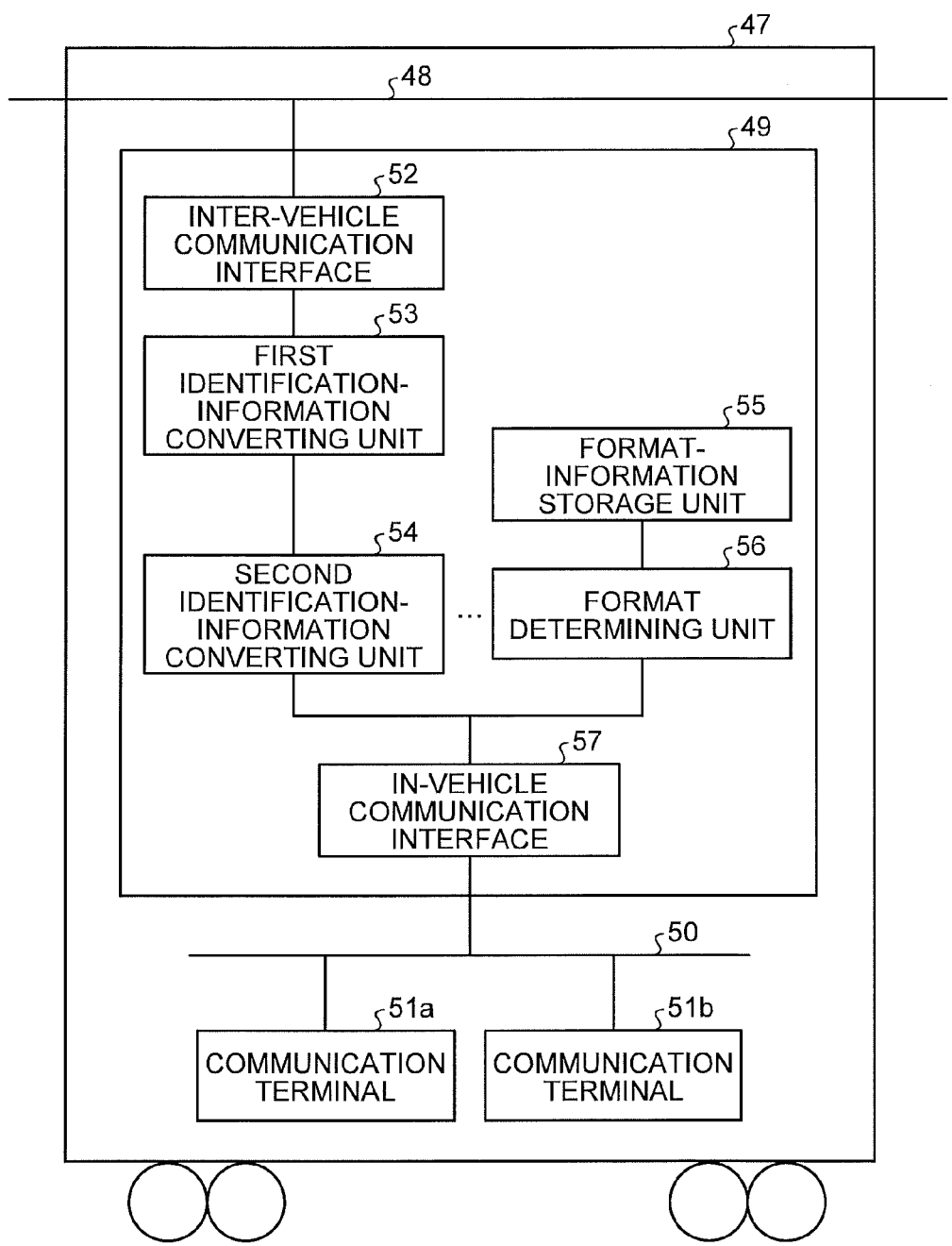
FIG. 16 is an arrangement diagram of a communication relay device for a train within a formation according to a sixth embodiment of the present invention.

FIG. 16 is an arrangement diagram of a communication relay device for a train within a train according to a sixth embodiment of the present invention. In FIG. 16, a communication relay device 49 is installed within a vehicle 47, and the communication relay device 49 is connected to communication terminals 51a and 51b, for example, via an in-vehicle communication path 50. The communication relay device 49 is also connected to an inter-vehicle communication path 48. The arrangement of the communication relay device 49 within the train is identical to that of the communication relay device in FIG. 7 or FIG. 14. The vehicle 47 is set as a first car of a first formation, for example.

The communication relay device 49 includes an inter-vehicle communication interface 52, a first identification-information converting unit 53, a second identification-information converting unit 54, a format-information storage unit 55, a format determining unit 56, and an in-vehicle communication interface 57. Functions of the inter-vehicle communication interface 52 and the in-vehicle communication interface 57 are identical to those of the first and second embodiments.

The first identification-information converting unit 53 has an identification-information conversion function of converting formation identification information. An operation of the first identification-information converting unit 53 is identical to those of the first identification-information converting units 35a, 35b, 35c, and 35d according to the fourth embodiment.

FIG. 17 depicts a structure of a communication packet transmitted and received by communication terminals of the present embodiment. As shown in FIG. 17, the communication packet includes communication-destination identification information, communication-source identification information, and a data portion. The communication-destination identification information includes formation identification information corresponding to a formation number of a communication destination, car identification information corresponding to a car number of the communication destination, and device identification information identifying a communication terminal within a vehicle of the communication destination. The communication-source identification information includes formation identification information corresponding to a formation number of a communication source, car identification information corresponding to a car number of the communication source, and device identification information identifying a communication terminal within a vehicle of the communication source.

In the third or fourth embodiment, specific car identification information indicating own vehicle is used as car identification information of a communication source. In the present embodiment, specific car identification information indicating own vehicle or a car number of a communication source is used as car identification information of the communication source.

For example, at the time of data transmission, when the communication terminal 51a uses specific car identification information indicating own vehicle for car identification information of a communication source, a structure of a communication packet transmitted from the communication terminal 51a is as shown in FIG. 18. As shown in FIG. 18, specific car identification information indicating own vehicle (identification information indicating own vehicle) is stored in car identification information of communication-source identification information, and device identification information indicating the communication terminal 51a (device identification information of the communication terminal 51a) is stored in device identification information of communication-source identification information. For identification information indicating own vehicle, for example, 0 (zero) can be used as a value of car identification information of the own car in a similar manner to that of the first embodiment.

When the communication terminal 51b uses information indicating a car number for car identification information of a communication source, a structure of a communication packet transmitted from the communication terminal 51b is as shown in FIG. 19. As shown in FIG. 19, car identification information indicating the first car (identification information indicating the first car) is stored in car identification information of communication-source identification information, and device identification information indicating the communication terminal 51b (device identification information of the communication terminal 51b) is stored in device identification information of communication-source identification information. For car identification information indicating the first car, a car number ("1", in this case) can be used, for example.

As explained above, in the communication terminals 51a and 51b, a format of car identification information used for a vehicle installed with each communication terminal is set in advance. Each communication terminal uses identification information indicating own vehicle or uses a car number, for car identification information of a vehicle in which the communication terminal itself is installed.

The format-information storage unit 55 stores format information about whether to use identification information indicating own vehicle or to use a car number, for car identification information of the communication terminals 51a and 51b connected to the in-vehicle communication path 50. That is, communication format information for each communication terminal installed within a vehicle is stored in the format-information storage unit 55. The format determining unit 56 determines a communication terminal that transmits or receives a communication packet from device identification information of a communication packet, based on format information of each communication terminal stored in the format-information storage unit 55. The format determining unit 56 determines whether to use "identification information indicating own vehicle" or to use "car number" in car identification of a car in which the communication terminal is installed.

For example, there is considered a case that the communication terminal 51a transmits a communication packet to the communication terminal 51b. FIG. 20 is an example of a communication packet in this case. In the present embodiment, the communication terminal 51a uses "identification information indicating own vehicle" for a format, and the communication terminal 51b uses "car number" for a format. In FIG. 20, "identification information indicating own vehicle" is used as car identification information of communication-destination identification information. The communication relay device 49 receives the communication packet using the in-vehicle communication interface 57, and determines whether it is necessary to change a format of the communication packet destined to the communication terminal 51b using the format determining unit 56 based on format information stored in the format-information storage unit 55. As a result, the communication relay device 49 sets "car number", that is, a car number of the first car, as the car identification information of the communication-destination identification information, and transmits this communication packet from the in-vehicle communication interface 57 to the in-vehicle communication path 50. FIG. 21 depicts a structure of the communication packet in this case.

There is considered a case that when the communication terminal 51a transmits a communication packet, which is as shown in FIG. 21, to the communication terminal 51b. In this case, the communication relay device 49 receives the communication packet using the in-vehicle communication interface 57, and determines whether it is necessary to change a format of the communication packet destined to the communication terminal 51b using the format determining unit 56 based on format information stored in the format-information storage unit 55. As a result, the communication relay device 49 determines that it is not necessary to change the format, and does not change the format. The communication terminal 51b receives the communication packet, of which format is not changed, transmitted from the communication terminal 51a.

Further, there is considered a case that the communication terminal 51b transmits a communication packet to the communication terminal 51a. FIG. 22 is an example of a communication packet in this case. In FIG. 22, "identification information indicating the first car" is used as the car identification information of communication-destination identification information. In this case, the communication relay device 49 receives the communication packet using the in-vehicle communication interface 57, and determines whether it is necessary to change a format of the communication packet destined to the communication terminal 51a using the format determining unit 56 based on format information stored in the format-information storage unit 55. As a result, the communication relay device 49 sets "identification information indicating own vehicle" as the car identification information of the communication-destination identification information, and transmits this communication packet from the in-vehicle communication interface 57 to the in-vehicle communication path 50. FIG. 23 depicts a structure of the communication packet in this case.

Furthermore, there is considered a case that when the communication terminal 51b transmits a communication packet, which is as shown in FIG. 23, to the communication terminal 51a. In this case, the communication relay device 49 receives the communication packet using the in-vehicle communication interface 57, and determines whether it is necessary to change a format of the communication packet destined to the communication terminal 51a using the format determining unit 56 based on format information stored in the format-information storage unit 55. As a result, the communication relay device 49 determines that it is not necessary to change the format, and does not change the format. The communication terminal 51a receives a communication packet, of which format is not changed, transmitted from the communication terminal 51b.

While the above operation is explained for communication terminals within the same vehicle, a similar conversion of identification information is performed when communication relay devices within a formation communicate with each other.

While an example of mutually using "information indicating own vehicle" and "car number" is explained for vehicle identification information of a communication terminal according to the present embodiment, "information indicating own formation" and "formation number" can be mutually used for formation identification information in a similar manner.

INDUSTRIAL APPLICABILITY

As described above, the communication relay device for a train according to the present invention is useful for communications between vehicles and formations of a train.

The invention claimed is:

1. A communication relay device for a train, mounted on a vehicle of a train having a vehicle formation including a plurality of vehicles, connected to an inter-vehicle communication path and to an in-vehicle communication path, and capable of relaying communications between communication terminals installed within own vehicle and communications between communication terminals installed in different vehicles, the communication relay device comprising:
    an inter-vehicle communication interface capable of transmitting and receiving a communication packet via the inter-vehicle communication path;
    an in-vehicle communication interface capable of transmitting and receiving a communication packet via the in-vehicle communication path; and
    an identification-information converting unit that
        converts, when vehicle identification information of a communication destination included in communication-destination identification information of a communication packet received from the in-vehicle communication path via the in-vehicle communication interface indicates other vehicle, vehicle identification information of a communication source, which is included in communication-source identification information of the communication packet and is vehicle identification information indicating own vehicle and used in common by each vehicle within the vehicle formation, into vehicle identification information for identifying a position of own vehicle within the vehicle formation, and then transmits the communication packet to the inter-vehicle communication path via the inter-vehicle communication interface, and
        converts, when vehicle identification information of a communication destination included in communication-destination identification information of a communication packet received from the inter-vehicle communication path via the inter-vehicle communication interface indicates own vehicle, the vehicle identification information of the communication destination into vehicle identification information indicating own vehicle and used in common by each vehicle within the vehicle formation and then transmits the communication packet to the in-vehicle communication path via the in-vehicle communication interface.

2. The communication relay device for a train according to claim 1, further comprising:
a format-information storage unit that has stored therein, for each communication terminal installed within own vehicle, information about whether a format of vehicle identification information used for own vehicle is a first format using vehicle identification information indicating own vehicle and used in common by each vehicle within the vehicle formation, or is a second format using vehicle identification information for identifying a position of own vehicle within the vehicle formation; and
a format determining unit that determines whether it is necessary to change a format of the communication packet, based on the format information stored in the format-information storage unit, wherein
the identification-information converting unit
sets, when the vehicle identification information of the communication destination included in the communication-destination identification information of the communication packet received from the in-vehicle communication path via the in-vehicle communication interface indicates other vehicle and the format determining unit determines that format information used by a transmission-source communication terminal of the communication packet is the first format, the vehicle identification information for identifying a position of own vehicle within the vehicle formation as the vehicle identification information of the communication source included in the communication-source identification information of the communication packet and then transmits the communication packet to the inter-vehicle communication path via the inter-vehicle communication interface, and
sets, when the vehicle identification information of the communication destination included in the communication-destination identification information of the communication packet received from the inter-vehicle communication path via the inter-vehicle communication interface indicates own vehicle and the format determining unit determines that format information used by a transmission-destination communication terminal of the communication packet is the first format, the vehicle identification information indicating own vehicle and used in common by each vehicle within the vehicle formation as the vehicle identification information of the communication destination and then transmits the communication packet to the in-vehicle communication path via the in-vehicle communication interface.

3. A communication relay device for a train, mounted on a vehicle of a train having a plurality of vehicle formations, connected to an inter-vehicle communication path and to an in-vehicle communication path, and capable of relaying communications between communication terminals installed within own vehicle and communications between communication terminals installed in different vehicles, the communication relay device comprising:
an inter-vehicle communication interface capable of transmitting and receiving a communication packet via the inter-vehicle communication path;
an in-vehicle communication interface capable of transmitting and receiving a communication packet via the in-vehicle communication path; and
an identification-information converting unit that
converts, when vehicle-formation identification information of a communication destination included in communication-destination identification information of a communication packet received from the in-vehicle communication path via the in-vehicle communication interface indicates other vehicle formation, vehicle-formation identification information of a communication source, which is included in communication-source identification information of the communication packet and is vehicle-formation identification information indicating own vehicle formation and used in common by each vehicle formation within the train, into vehicle-formation identification information for identifying a position of own vehicle formation within the train, and then transmits the communication packet to the inter-vehicle communication path via the inter-vehicle communication interface, and
converts, when vehicle-formation identification information of a communication destination included in communication-destination identification information of a communication packet received from the inter-vehicle communication path via the inter-vehicle communication interface indicates own vehicle formation, the vehicle-formation identification information of the communication destination into vehicle-formation identification information indicating own vehicle formation and used in common by each vehicle formation within the train and then transmits the communication packet to the in-vehicle communication path via the in-vehicle communication interface.

4. A communication relay device for a train, mounted on a vehicle of a train configured by combining a plurality of vehicle formations each formation having one or more vehicles, connected to an inter-vehicle communication path and to an in-vehicle communication path, and capable of relaying communications between communication terminals installed within own vehicle and communications between communication terminals installed in different vehicles, the communication relay device comprising:
an inter-vehicle communication interface capable of transmitting and receiving a communication packet via the inter-vehicle communication path;
an in-vehicle communication interface capable of transmitting and receiving a communication packet via the in-vehicle communication path;
a first identification-information converting unit that
converts, when vehicle-formation identification information of a communication destination included in communication-destination identification information of a communication packet received via the in-vehicle communication interface indicates other vehicle formation, vehicle-formation identification information of a communication source, which is included in communication-source identification information of the communication packet and is vehicle-formation identification information indicating own vehicle formation and used in common by each vehicle formation within the train, into vehicle-formation identification information for identifying a position of own vehicle formation within the train before the communication packet is transmitted via the inter-vehicle communication interface, and converts, when vehicle-formation identification information of a communication destination included in communication-destination identification information of a communication packet received via the inter-vehicle communication interface indicates own vehicle formation, the vehicle-formation identification information of the communication destination into vehicle-formation identification information indicating own vehicle formation and used in common by each vehicle formation within the train before the communication packet is transmitted via the in-vehicle communication interface; and a second identification-information converting unit that converts, when vehicle identification information of a communication destination included in communication-destination identification information of a communication packet received via the in-vehicle communication interface indicates other vehicle or when vehicle-formation identification information of the communication destination indicates other vehicle formation, vehicle identification information of a communication source included in communication-source identification information of the communication packet into vehicle identification information for identifying a position of own vehicle within the vehicle formation before the communication packet is transmitted via the inter-vehicle communication interface, and converts, when vehicle identification information of a communication destination included in communication-destination identification information of a communication packet received via the inter-vehicle communication interface indicates own vehicle, the vehicle identification information of the communication destination into vehicle identification information indicating own vehicle and used in common by each vehicle within the vehicle formation before the communication packet is transmitted via the in-vehicle communication interface.

5. The communication relay device for a train according to claim 4, further comprising:

a format-information storage unit that has stored therein, for each communication terminal installed within own vehicle, information about whether a format of vehicle identification information used for own vehicle is a first format using vehicle identification information indicating own vehicle and used in common by each vehicle within the vehicle formation, or is a second format using vehicle identification information for identifying a position of own vehicle within the vehicle formation; and a format determining unit that determines whether it is necessary to change a format of the communication packet, based on the format information stored in the format-information storage unit, wherein the second identification-information converting unit sets, when the vehicle identification information of the communication destination included in the communication-destination identification information of the communication packet received via the in-vehicle communication interface indicates other vehicle or when the vehicle-formation identification information of the communication destination indicates other vehicle formation, and also when the format determining unit determines that format information used by a transmission-source communication terminal of the communication packet is the first format, the vehicle identification information for identifying a position of own vehicle within the vehicle formation as vehicle identification information of the communication source included in the communication-source identification information of the communication packet before the communication packet is transmitted via the inter-vehicle communication interface, and sets, when the vehicle identification information of the communication destination included in the communication-destination identification information of the communication packet received via the inter-vehicle communication interface indicates own vehicle and the format determining unit determines that format information used by a transmission-destination communication terminal of the communication packet is the first format, the vehicle identification information indicating own vehicle and used in common by each vehicle within the vehicle formation as the vehicle identification information of the communication destination before the communication packet is transmitted via the in-vehicle communication interface.

6. A communication relay method for a train, for a communication relay device for a train, mounted on a vehicle of a train having a vehicle formation including a plurality of vehicles, connected to an inter-vehicle communication path and to an in-vehicle communication path, and capable of relaying communications between communication terminals installed within own vehicle and communications between communication terminals installed in different vehicles, the method comprising:

converting, when vehicle identification information of a communication destination included in communication-destination identification information of a communication packet received from the in-vehicle communication path via an in-vehicle communication interface indicates other vehicle, vehicle identification information of a communication source, which is included in communication-source identification information of the communication packet and is vehicle identification information indicating own vehicle and used in common by each vehicle within the vehicle formation, into vehicle identification information for identifying a position of own vehicle within the vehicle formation and then transmitting the communication packet to the inter-vehicle communication path via an inter-vehicle communication interface; and converting, when vehicle identification information of a communication destination included in communication-destination identification information of a communication packet received from the inter-vehicle communication path via the inter-vehicle communication interface indicates own vehicle, vehicle identification information of the communication destination, which is vehicle identification information for identifying a position of own vehicle within the vehicle formation, into vehicle identification information indicating own vehicle and used in common by each vehicle within the vehicle formation and then transmitting the communication packet to the in-vehicle communication path via the in-vehicle communication interface.

7. A communication relay method for a train, for a communication relay device for a train, mounted on a vehicle of a train including a plurality of vehicle formations, connected to an inter-vehicle communication path and to an in-vehicle communication path, and capable of relaying communications between communication terminals installed within own vehicle and communications between communication terminals installed in different vehicles, the method comprising:

converting, when vehicle-formation identification information of a communication destination included in communication-destination identification information of a communication packet received from the in-vehicle communication path via an in-vehicle communication interface indicates other vehicle formation, vehicle-formation identification information of a communication source, which is included in communication-source identification information of the communication packet and is vehicle-formation identification information indicating own vehicle formation and used in common by each vehicle formation within the train, into vehicle-formation identification information for identifying a position of own vehicle formation within the train and then transmitting the communication packet to the inter-vehicle communication path via an inter-vehicle communication interface; and converting, when vehicle-formation identification information of a communication destination included in communication-destination identification information of a communication packet received from the inter-vehicle communication path via the inter-vehicle communication interface indicates own vehicle formation, vehicle-formation identification information of the communication destination into vehicle-formation identification information indicating own vehicle formation and used in common by each vehicle formation within the train and then transmitting the communication packet to the in-vehicle communication path via the in-vehicle communication interface.

8. A communication relay method for a train, for a communication relay device for a train, mounted on a vehicle of a train configured by combining a plurality of vehicle formations each formation having one or more vehicles, connected to an inter-vehicle communication path and to an in-vehicle communication path, and capable of relaying communications between communication terminals installed within own vehicle and communications between communication terminals installed in different vehicles, the method comprising:

converting, when vehicle identification information of a communication destination included in communication-destination identification information of a communication packet received from the in-vehicle communication path via an in-vehicle communication interface indicates other vehicle or when vehicle-formation identification information of a communication destination indicates other vehicle formation, vehicle identification information of a communication source included in communication-source identification information of the communication packet, which is vehicle identification information indicating own vehicle and used in common by each vehicle within the train, into vehicle identification information for identifying a position of own vehicle within the vehicle formation;

converting, when vehicle-formation identification information of the communication destination indicates other vehicle formation, vehicle-formation identification information of a communication source included in communication-source identification information of the communication packet, which is vehicle-formation identification information indicating own vehicle formation and used in common by each vehicle formation within the train, into vehicle-formation identification information for identifying a position of own vehicle formation within the train and then transmitting the communication packet to the inter-vehicle communication path via an inter-vehicle communication interface;

converting, when vehicle-formation identification information of a communication destination included in communication-destination identification information of a communication packet received from the inter-vehicle communication path via the inter-vehicle communication interface indicates own vehicle formation, vehicle-formation identification information of the communication destination, which is vehicle-formation identification information for identifying a position of own vehicle formation within the train, into vehicle-formation identification information indicating own vehicle formation and used in common by each vehicle formation within the train; and converting vehicle identification information of the communication destination, which is vehicle identification information for identifying a position of own vehicle within a vehicle formation, into vehicle identification information indicating own vehicle and used in common by each vehicle within the train and then transmitting the communication packet to the in-vehicle communication path via the in-vehicle communication interface.

* * * * *